(12) United States Patent
Takekuma et al.

(10) Patent No.: US 8,709,618 B2
(45) Date of Patent: Apr. 29, 2014

(54) MAGNETIC STORAGE APPARATUS

(75) Inventors: Ikuko Takekuma, Kanagawa (JP);
Hiroyuki Nakagawa, Kanagawa (JP);
Hiroaki Nemoto, Kanagawa (JP);
Yoshiyuki Hirayama, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 1336 days.

(21) Appl. No.: 11/726,099

(22) Filed: Mar. 20, 2007

(65) Prior Publication Data

US 2007/0223142 A1  Sep. 27, 2007

(30) Foreign Application Priority Data

Mar. 23, 2006  (JP) ................................. 2006-081044

(51) Int. Cl.
*G11B 5/66* (2006.01)

(52) U.S. Cl.
USPC ........................................................ 428/827

(58) Field of Classification Search
USPC ........ 428/282.1, 836.2, 827–830; 360/125.02
See application file for complete search history.

(56) References Cited

U.S. PATENT DOCUMENTS

| | | | |
|---|---|---|---|
| 6,620,533 B2 | 9/2003 | Hikosaka et al. | |
| 2002/0176214 A1 | 11/2002 | Shukh et al. | |
| 2003/0152805 A1* | 8/2003 | Bertero et al. | 428/692 |
| 2003/0157375 A1 | 8/2003 | Uwazumi et al. | |
| 2005/0138796 A1* | 6/2005 | Takahashi et al. | 29/603.14 |
| 2005/0141137 A1 | 6/2005 | Okada et al. | |
| 2005/0141142 A1* | 6/2005 | Mochizuki et al. | 360/319 |
| 2005/0153169 A1* | 7/2005 | Watanabe et al. | 428/694 BM |
| 2006/0092564 A1* | 5/2006 | Le | 360/126 |
| 2006/0092575 A1* | 5/2006 | Mochizuki et al. | 360/317 |
| 2006/0204791 A1 | 9/2006 | Sakawaki et al. | |

FOREIGN PATENT DOCUMENTS

| | | |
|---|---|---|
| JP | 2001-222809 A | 8/2001 |
| JP | 2003-178413 A | 6/2003 |
| JP | 2003-317221 | 11/2003 |
| JP | 2004-310910 A | 11/2004 |
| JP | 2005-190518 | 7/2005 |

OTHER PUBLICATIONS

Ramamurthy et al., "Anisotropy Enhanced Dual Magnetic Layer Media Design for High-Density Perpendicular Recording," *IEEE Transactions on Magnetics*, vol. 41, No. 10 (Oct. 2005), pp. 3145-3147.

(Continued)

*Primary Examiner* — Holly Rickman
*Assistant Examiner* — Linda Chau
(74) *Attorney, Agent, or Firm* — Zilka-Kotab, PC

(57) ABSTRACT

According to embodiments of the present invention, a shielded pole writer and a perpendicular magnetic recording medium suitable thereto are combined to provide high medium SNR and excellent OW characteristic simultaneously. A perpendicular magnetic recording medium of a magnetic storage apparatus mounting a shielded pole writer, including a perpendicular magnetic recording medium having a recording layer of a three layered structure is used. A first recording layer has a granular structure consisting of grain boundaries containing an oxide and columnar grains comprising a CoCrPt alloy, in which a second recording layer and a third recording layer formed thereabove comprise Co as a main ingredient, contain Cr and do not contain an oxide, and the Cr concentration in the second recording layer is lower than the Cr concentration in the third recording layer.

18 Claims, 7 Drawing Sheets

(56) References Cited

OTHER PUBLICATIONS

Bai et al., Micromagnetic Modeling of SNR Performance of Longitudinal and Perpendicular Media With Various Head/SUL Combinations, Jul. 2004, pp. 2555-2557 vol. 40 Issue: 4, IEEE Transactions on Magnetics.

Hong et al., Improved Recording Performance Using Side-Shielded Pole Head in PMR Drive, Jul. 2004, pp. 2374-2376, vol. 40 Issue: 4, IEEE Transactions on Magnetics.

Japanese Office Action for Application No. 2006-081044, dated Feb. 23, 2010, 4 pages total.

* cited by examiner

MAGNETIC STORAGE APPARATUS

CROSS-REFERENCE TO RELATED APPLICATION

The instant nonprovisional patent application claims priority to Japanese Patent Application No. 2006-081044 filed Mar. 23, 2006 and incorporated by reference in its entirety herein for all purposes.

BACKGROUND OF THE INVENTION

In recent years, the amount of information handled by computers has been increased and consequently an increase in the capacity of a hard disk unit as an auxiliary memory apparatus has been demanded. Further, along with progress for the mounting of a hard disk unit to domestic electric products, demand for decreasing the size and increasing the capacity of the hard disk unit has been increased more and more. While a hard disk unit using a longitudinal magnetic recording system has attained an in-plane recording density exceeding 20 Gbits/cm$^2$, it has become difficult to further increase the recording density by using the system. As an alternative system, a perpendicular recording system has now been investigated. It is considered that the perpendicular recording system is more advantageous compared with the longitudinal magnetic recording system for increasing density since it suffers less from effects of the demagnetizing field in a high density recording region.

For the perpendicular magnetic recording medium used for the perpendicular recording system, a recording layer comprising a CoCrPt alloy used in the longitudinal magnetic recording medium has been considered. However, for further decreasing noise, a granular type recording layer with the addition of oxygen or oxide to the CoCrPt alloy has been proposed and has attracted attention. The granular type recording layer is described, for example, in Japanese Laid-Open Patent No. 2001-222809A and Japanese Laid-Open Patent No. 2003-178413A. In a case of a conventional recording layer comprising the CoCrPt alloy, a non-magnetic material mainly comprising Cr is segregated to the grain boundary by utilizing the phase separation between Co and Cr. Therefore, the magnetic crystal grains are isolated magnetically, thereby reducing the noise. While it is necessary to add more Cr in order to increase the effect of noise reduction further, Cr remains in a great amount also in the magnetic crystal grains. In this case, it results in a problem of lowering the magnetic anisotropy energy and deteriorating the stability of recording signals. On the other hand, in a case of a granular type recording layer in which oxygen or oxide is added to the CoCrPt alloy, since the oxide is separated easily from magnetic crystal grains, a structure where the oxide surrounds the magnetic crystal grain can be formed without addition of a large amount of Cr so long as a template trigger of forming an oxide grain boundary is formed in an underlayer. Further, since the amount of Cr contained in the magnetic crystal grain can be decreased, noises can be decreased without lowering the magnetic anisotropy energy (Ku). However, while the medium described above has large Ku and excellent thermal stability, it causes deterioration of the overwrite characteristic (hereinafter referred to as OW characteristic) since the coercivity of the medium increases. For improving the OW characteristic, there is a method of increasing the Cr addition amount in the recording layer or a method of decreasing the thickness of the recording layer, but neither is preferred since the thermal stability is degraded. As a method for solving the problem, a perpendicular magnetic recording medium in which a recording layer comprising a CoCr alloy without an oxide is laminated over a granular type recording layer where an oxide is added to a CoCrPt alloy has been proposed as describe, for example, in Japanese Laid-Open Patent No. 2004-310910A and in IEEE Transactions on Magnetics, Vol. 41, No. 10, p. 3145 (2005). It has been reported that the perpendicular magnetic recording medium of such a laminate type recording layer is excellent in the thermal stability and can provide a sufficient OW characteristic and high medium SNR compared with the conventional perpendicular magnetic recording medium having a single layered granular type recording layer.

For attaining a high density recording exceeding 30 Gbits/cm$^2$, it is necessary to increase the track density together with the linear recording density and, for improving the track density, it is necessary to make the track width of the magnetic head finer and enhance the accuracy. In addition, as the track becomes narrower, a problem occurs when the effective track width to be written into a medium is larger than the geometrical track width, which forms a bottleneck for the improvement of the track density. For solving this problem, a shielded pole writer has been developed as shown, for example, in U.S. Patent Publication No. 2002/0176214A1 or Japanese Laid-Open Patent No. 2005-190518A. The shielded pole writer is an improved single-pole-type writer where a write section includes a main pole and an auxiliary pole disposed on the leading side in the down-track direction, which is a head of a structure in which a magnetic shield is disposed so as to cover at least the trailing side in the down-track direction of the main pole via a non-magnetic gap layer for improving write-field gradients. Hereinafter, the shield means a shield disposed near the main pole of the recording unit of the magnetic head.

Since the shielded pole writer has a higher effect of narrowing an effective track width to be written onto a medium, as well as it can increase write-field gradients compared with a conventional single-pole-type writer without shield, it has an effect of improving the medium SNR. However, since the write-field intensity is small, no sufficient OW characteristic can be obtained easily. That is, in a combination with a shielded pole writer capable of attaining high track density, there exists a subject in the medium design capable of obtaining high medium SNR while ensuring sufficient OW characteristic. As described above, while a perpendicular magnetic recording medium in which a recording layer comprising a CoCr alloy not containing oxide is stacked on a granular type recording layer with addition of an oxide to a CoCrPt alloy is excellent in the OW characteristic, the condition for obtaining a sufficient OW characteristic is still severe even in the case of using such a medium when it is in combination with the shielded pole writer and the medium SNR is inevitably degraded. That is, it has been extremely difficult to attain a recording density exceeding 30 Gbits/cm$^2$ by overcoming a trade off relation between the OW characteristic and the medium SNR.

BRIEF SUMMARY OF THE INVENTION

In accordance with embodiments of the present invention, a shielded pole writer and a perpendicular magnetic recording medium suitable thereto are combined to provide high medium SNR and excellent OW characteristic simultaneously. A perpendicular magnetic recording medium of a magnetic storage apparatus mounting a shielded pole writer, including a perpendicular magnetic recording medium having a recording layer of a three layered structure is used. In accordance with the particular embodiment shown in FIG. 3, a first recording layer 37 has a granular structure consisting of grain boundaries containing an oxide and columnar grains comprising a CoCrPt alloy, in which a second recording layer 38 and a third recording layer 39 formed thereabove comprise Co as a main ingredient, contain Cr and do not contain an oxide, and the Cr concentration in the second recording layer is lower than the Cr concentration in the third recording layer.

DETAILED DESCRIPTION OF THE INVENTION

Figure 1:
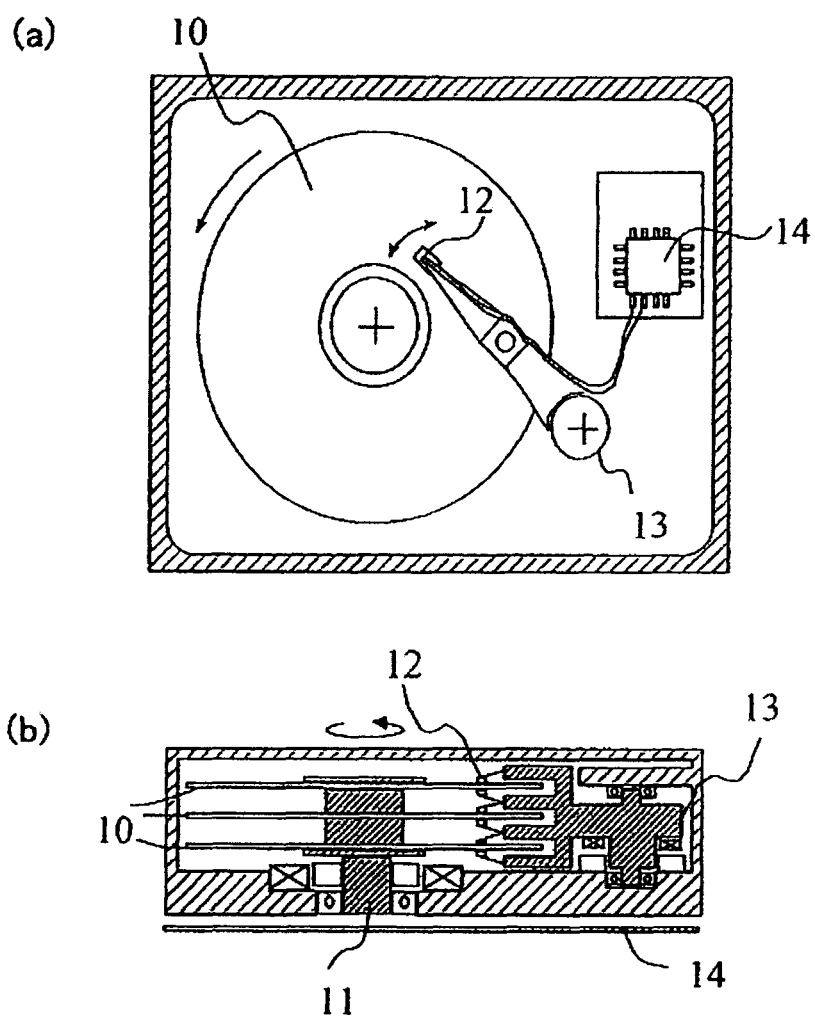
FIG. 1 is a schematic cross sectional view showing a magnetic storage apparatus as an example of one embodiment of the present invention.

Embodiments in accordance with the present invention relate to a magnetic storage apparatus capable of recording large volumes of information. An object of an embodiment of the present invention is to find a perpendicular magnetic recording medium capable of attaining high medium SNR and excellent OW characteristic at the same time which is suitable to combine with a shielded pole writer and provide, particularly, a magnetic storage apparatus capable of high density recording exceeding 30 Gbits/cm$^2$.

Since the shielded pole writer has smaller write-field intensity compared with the conventional single-pole-type writer with no shield, it is necessary to decrease the magnetic field necessary for magnetization reversal of the recording layer (hereinafter referred to as a switching field) in order to obtain sufficient OW characteristic in the combination with a shielded pole writer. As a result of a detailed study on a perpendicular magnetic recording medium in which a recording layer comprising a CoCr alloy without an oxide is stacked on a granular type recording layer with addition of an oxide to the CoCrPt alloy with an aim of combination with the shielded pole writer, the following knowledge has been obtained on the mechanism for the trade off relation between the medium SNR and the OW characteristic.

Read/write performance and magnetic properties can be changed by controlling the inter-granular exchange coupling by changing the Cr concentration in the recording layer comprising a CoCr alloy without an oxide. As the Cr concentration is lowered in the recording layer not containing the oxide, and since the inter-granular exchange coupling increases, the switching field is lowered and the OW characteristic is improved. However, since this increases the magnetic cluster size simultaneously, transition noises increase to deteriorate the medium SNR. On the other hand, in a case of increasing the Cr concentration in the recording layer not containing the oxide, the distribution of the switching field can be decreased while suppressing the increase of the magnetic cluster size to improve the medium SNR. In addition, the OW characteristic is deteriorated and the resolution is degraded. Further, in a case of increasing the Cr concentration, the recording layer containing the oxide and the recording layer not containing the oxide are reversed separately to also deteriorate the medium SNR.

In accordance with embodiments of the present invention, as a magnetic recording medium of a magnetic storage apparatus mounting a shielded pole writer, a magnetic recording medium having a recording layer of a three-layered structure is used. A first recording layer on the side nearest to the substrate has a granular structure consisting of grain boundaries containing an oxide and columnar grains comprising a CoCrPt alloy, and a second recording layer and a third recording layer formed thereover comprise Co as a main ingredient, contain Cr and do not contain an oxide, and the Cr concentration in the second recording layer is lower than the Cr concentration in the third recording layer. By the combination of the shielded pole writer and the magnetic recording medium described above, high medium SNR, excellent OW characteristic, and high resolution can be attained simultaneously which is effective for increasing the density of the magnetic storage apparatus.

As described above, by the use of a composition with a high Cr concentration for the third recording layer while ensuring a sufficient OW characteristic, and by the use of a composition of low Cr concentration for the second recording layer, the distribution of the switching field can be decreased without increasing the magnetic cluster size to obtain a high medium SNR. On the other hand, in a case where the Cr concentration in the second recording layer is higher than the Cr concentration of the third recording layer, this tends to cause a phenomenon that the first recording layer, the second recording layer, and the third recording layer cause reversal of magnetization separately, failing to obtain a high medium SNR. For obtaining a higher medium SNR, it is necessary to suppress the distribution of the switching field without increasing the magnetic cluster size. For this purpose, it is desirable that the thickness ratio of the third recording layer of higher Cr concentration is larger, and higher medium SNR, excellent OW characteristic, and high resolution can be attained by defining t2/(t2+t3) to 0.1 or more and 0.4 or less where t2 represents the thickness (nm) of the second recording layer and t3 represents the film thickness (nm) of the third recording layer. Further, higher medium SNR can be obtained while maintaining excellent OW characteristic by defining the Cr concentration in the second recording layer to 13 at. % or more and 19 at. % or less, the Cr concentration in the third recording layer to 20 at. % or more and 24 at. % or less, and the difference between the Cr concentration in the second recording layer and the Cr concentration in the third recording layer to 4 at. % or more.

In a case of combining the perpendicular magnetic recording medium found by the invention with a conventional single-pole-type writer with no shield, the effect of improving the medium SNR can not be obtained. While the single-pole-type writer with no shield can increase the write-field intensity compared with the shielded pole writer, no large write-field gradients can be obtained. Particularly in a case where the write-field intensity is small, the write-field gradient is greatly decreased in the single-pole-type writer with no shield compared with the shielded pole writer. Accordingly, in a case where the perpendicular magnetic recording medium described in the invention with small switching field is combined with a shielded pole writer, since writing can be conducted at a sufficiently large field gradient, an effect of improving the medium SNR can be obtained. On the other hand, in a case of combination with a single-pole-type writer with no shield, since writing is conducted under a field of small gradient, the medium SNR is not improved. Further, since the single-pole-type writer with no shield has sufficiently high write-field intensity, the effect on the OW characteristic is insignificant even when the inter-granular exchange coupling of the recording layer not containing the oxide is decreased to lower the switching field, and the effect of improving the medium SNR due to improvement of the OW characteristic is also observed scarcely.

Embodiments of the present invention can attain high medium SNR, excellent OW characteristic, and high resolution simultaneously to provide an effect in increasing the density of the magnetic storage apparatus.

A perpendicular magnetic recording medium of an example of an embodiment of the present invention was manufactured by using a sputtering apparatus (C3010) manufactured by Anelva Corp. The apparatus comprises ten processing chambers and one disk load/unload chamber, in which each of the chambers is evacuated independently. All the chambers have an air evacuation capacity of $6 \times 10^{-6}$ Pa or less.

The static magnetic properties of the recording layer were evaluated by using a Kerr effect magnetometer. A magnetic field was swept at a constant speed from −1592 kA/m to +1592 kA/m in the perpendicular direction for 30 seconds to measure a Kerr loop. The composition for each of the layers of the medium was determined by using X-ray photoelectron spectroscopy (XPS). The sample was etched by sputtering from the surface thereof in the direction of the depth by an ion gun at an acceleration voltage of 500 V and a range for 1.5 mm length and 0.1 mm width was analyzed by using aluminum emit Kα rays of as an X-ray source. The content for each of elements was determined by detecting spectrum near the energy corresponding to is electrons of C, 1s electrons of O, 2s electrons of Si, 2p electrons of Cr, 2p electrons of Co, 3d electrons of Ru, and 4f electrons of Pt, respectively.

Embodiments of the present invention are to be described with reference to the drawings.

Experimental Example 1

Figure 2:
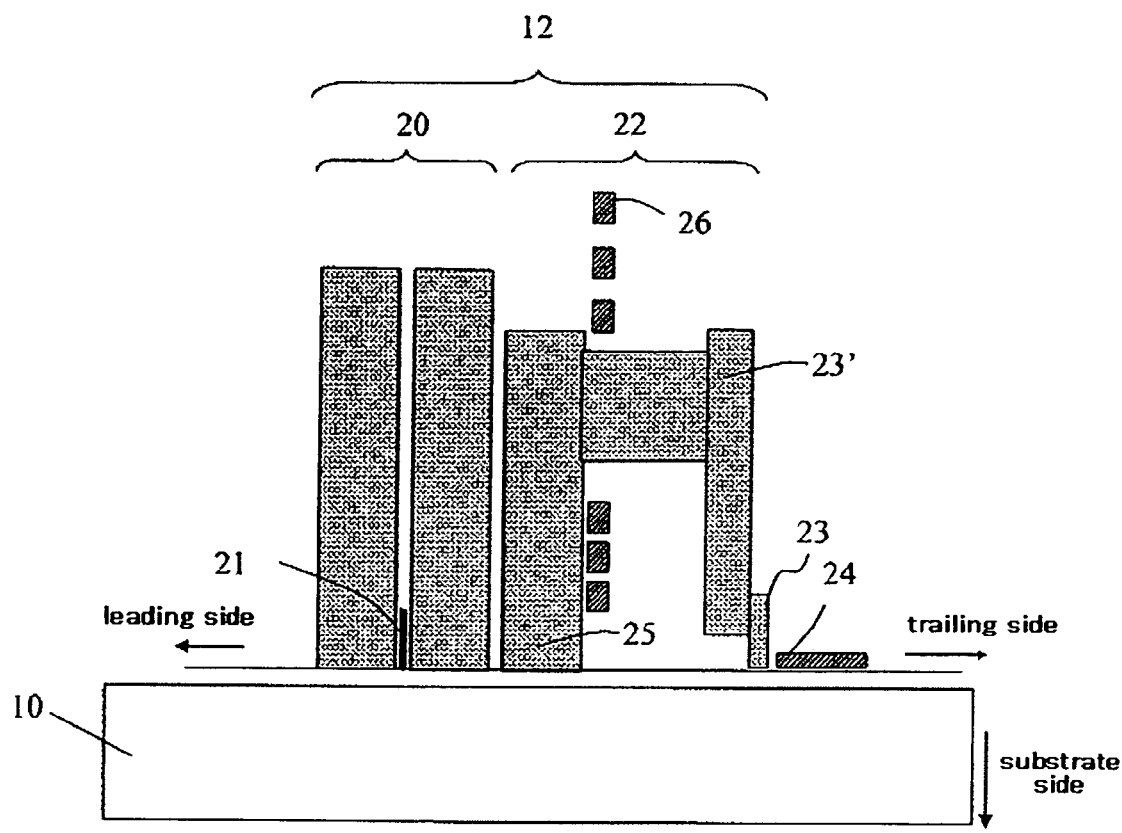
FIG. 2 is a schematic view showing a relation between a magnetic head and a magnetic recording medium in a magnetic storage apparatus as an example of another embodiment of the present invention.

FIG. 1 shows a schematic view of a magnetic storage apparatus as an example of one embodiment of the present invention. FIG. 1(a) is a schematic plan view and FIG. 1(b) is a schematic cross sectional view thereof. The magnetic storage apparatus includes a magnetic recording medium 10, a driving section 11 for driving the magnetic recording medium, a magnetic head 12 comprising a recording unit and a read portion, means 13 for relatively moving the magnetic head to the magnetic recording medium, and means 14 for inputting and outputting signals to the magnetic head. A relation between the magnetic head 12 and the magnetic recording medium 10 is shown in FIG. 2. The read section 20 has a read element put between a pair of magnetic shields, and a giant magnetoresistive (GMR) element, or tunneling magnetoresistive (TMR) element, etc. is used for the read element 21. The recording unit 22 is of a structure having a main pole, an auxiliary pole 25, and a coil 26, in which the main pole comprises a yoke part of main pole 23' and a pole tip of main pole 23, and a shield 24 is formed around the pole tip of main pole 23 so as to cover at least the trailing side in the down-track direction of the main pole via a non-magnetic gap layer.

Figure 3:
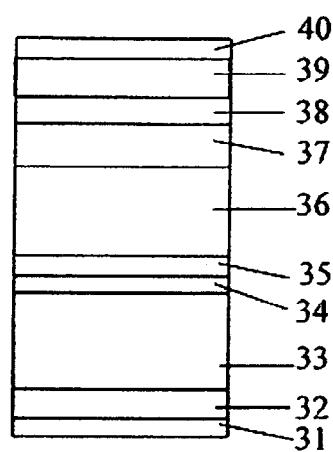
FIG. 3 is a schematic cross sectional view showing the layer structure of a perpendicular magnetic recording medium of an example of an embodiment of the present invention.
Figure 4:
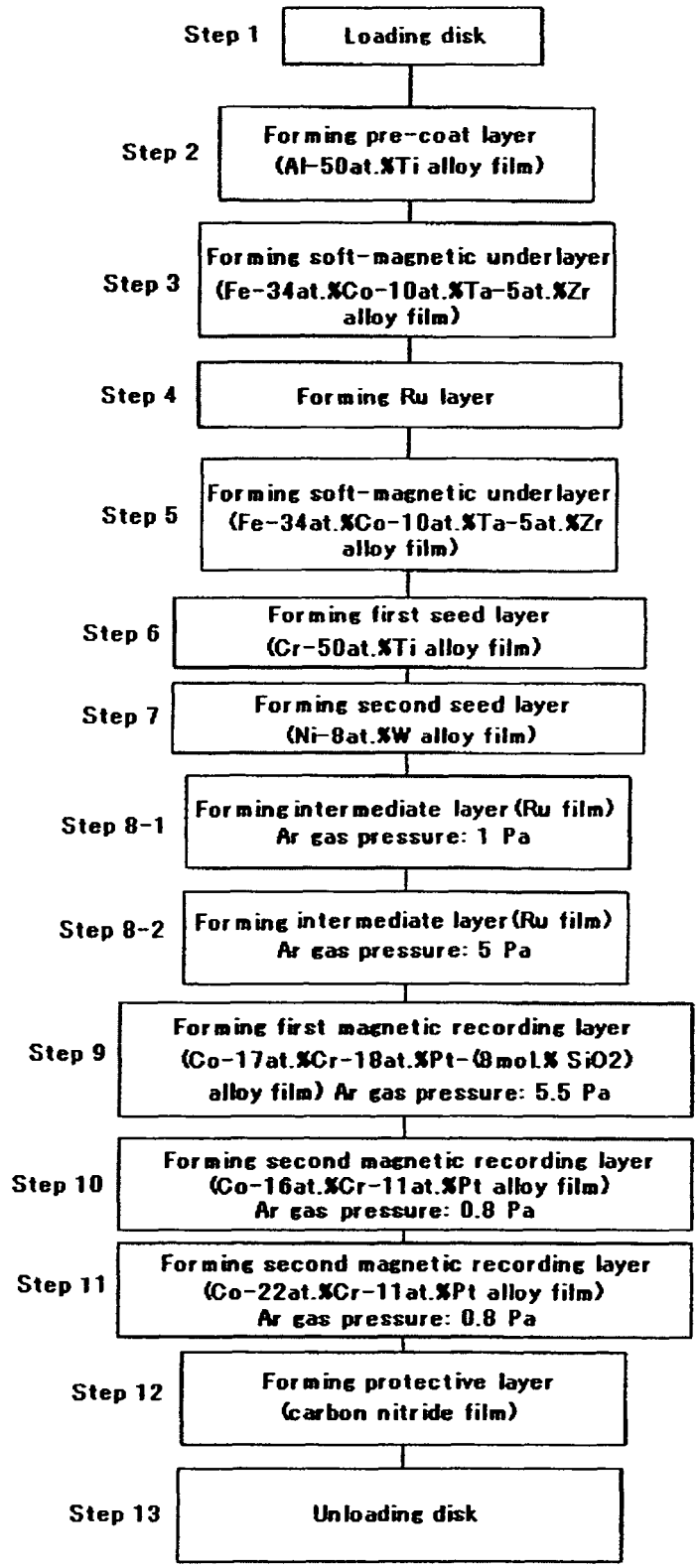
FIG. 4 is a view showing manufacturing steps of a perpendicular magnetic recording medium of an example of an embodiment of the present invention.

FIG. 3 is a view showing a structural example of a perpendicular magnetic recording medium in this experimental example. The perpendicular magnetic recording medium of this experimental example has a structure in which a pre-coat layer 32, a soft-magnetic underlayer 33, a first seed layer 34, a second seed layer 35, an intermediate layer 36, a first recording layer 37, a second recording layer 38, a third recording layer 39, and a protective layer 40 are successively stacked above a substrate 31. FIG. 4 shows a method of forming a film of the perpendicular magnetic recording medium in this example.

Without heating the substrate, an Al-50 at % Ti alloy film of 5 nm thickness as the pre-coat layer 32, an Fe-34 at. % Co-10 at. % Ta-5 at. % Zr alloy film of 60 nm in total thickness as the soft-magnetic underlayer 33, a Cr-50 at % Ti film of 2 nm thickness as the first seed layer 34, and an Ni-8 at. % W of 7 nm thickness as the second seed layer 35 were formed under the condition at an Ar gas pressure of 0.7 Pa. A structure of anti-ferromagnetically coupling two layers via Ru was used for the soft-magnetic underlayer 33 (steps 1 to 7). After forming a Ru film of 8 nm thickness as the intermediate layer 36 under the conditions at an Ar gas pressure of 1 Pa, a Ru film of 8 nm thickness was stacked thereover under the condition at an Ar gas pressure of 5 Pa. After forming (Co-17 at. % Cr-18 at. % Pt)-8 mol. % SiO2 of 13 nm thickness as the first recording layer 37 over the intermediate layer 36, the second recording layer 38 and the third recording layer 39 not containing the oxide were formed and, finally, a carbon film of 4.5 nm thickness was formed as the protective layer 40. The first recording layer 37 containing the oxide was formed using a gas comprising Ar and 1.8% of oxygen mixed therewith under the condition at a total gas pressure of 5 Pa. The second recording layer 38 and the third recording layer 39 not containing the oxide were prepared under the condition at an Ar gas pressure of 0.8 Pa, and the carbon protective film 40 was prepared by using a gas comprising argon and 0.8% of nitrogen mixed therewith under the condition at a total gas pressure of 0.6 Pa (steps 8-1 to 13).

With an aim of examining the effect of the compositions for the second recording layer and the third recording layer not containing the oxide on the read/write performance, various samples of different compositions for the second recording layer and the third recording layer were prepared. Table 1 shows the composition and the film thickness of the second recording layer and the third recording layer, and the result of the read/write performance. For the evaluation of the read/write performance, a shielded pole writer in which a magnetic shield was disposed so as to cover the trailing side in the down-track direction and the cross-track direction of the main pole via a non-magnetic gap layer to a structure including a main pole and an auxiliary pole disposed on the leading side in the down-track direction was used. The head is hereinafter referred to as a trailing side shield head (refer to the schematic view for an air bearing surface (ABS) of a write head shown in FIG. 5(a)). A shield disposed so as to cover the lateral surface in the cross-track direction of the main pole 23 is referred to as a side shield and a shield disposed so as to cover the trailing side in the down-track direction is referred to as a trailing shield (refer to a schematic view for the air bearing surface of a write head shown in FIG. 5(b)). The track width of the read head used for evaluation is 70 nm, the track width of the write head is 110 nm, a distance between the main pole and the trailing shield is 100 nm, and the distance between the main pole and the side shield is 150 nm.

The medium SNR was determined as a ratio between a read output signal of isolated waveform when writing signals at a linear recording density of 1970 fr/mm and integrated noises when recording signals at a linear recording density of 23620 fr/mm. The OW characteristic was evaluated by using a ratio of the residual ingredient of signals at a recording density of 18780 fr/mm after overwriting signals at 3110 fr/mm over signals at 18780 fr/mm and intensity of signals at 3110 fr/mm. The resolution was evaluated as a ratio of the signal outputs at a linear recording density of 23620 fr/mm to signal outputs at a linear recording density of 1970 fr/mm. For the head used for evaluation, it is judged that sufficient writing has been done in a case where the OW value showed a value of −40 dB or less.

medium SNR, excellent OW characteristic, and high characteristic of resolution simultaneously.

For overcoming the conventional trade-off relation in the medium SNR and the OW characteristic, a sample in which a different second recording layer and third recording layer were stacked above the first recording layer was prepared. In Samples 1-6 and 1-7 prepared by replacing the portion above the recording layer not containing the oxide of the Sample 1-4 with the composition of low Cr concentration, the OW value was scarcely improved compared with Sample 1-4. On the other hand, Samples 1-8 to 1-10 prepared by replacing the portion below the recording layer not containing the oxide of 1-4 with the composition of low Cr concentration showed improvement for the OW value compared with Sample 1-4, and showed higher medium SNR compared with Sample 1-4. As described above, for attaining a perpendicular magnetic recording medium showing high medium SNR, excellent OW characteristic, and high resolution simultaneously, a structure formed by stacking a second recording layer and a third recording layer each comprising a layer containing Co as a main ingredient, containing Cr and not containing an oxide above a first recording layer having a granular structure consisting of grain boundaries containing an oxide and columnar grains comprising a CoCrPt alloy, and in which the Cr con-

TABLE 1

| Sample | Second recording layer Composition (at. %) | Film thickness (nm) | Third recording layer Composition (at. %) | Film thickness (nm) | Medium SNR (dB) | OW characteristic (−dB) | Resolution (%) |
|---|---|---|---|---|---|---|---|
| 1-1 | Co—14Cr—11Pt | 8 | None | 0 | 17.4 | 53.4 | 55.5 |
| 1-2 | Co—17Cr—11Pt | 8 | None | 0 | 18.6 | 45.7 | 53.7 |
| 1-3 | Co—20Cr—11Pt | 8 | None | 0 | 19.4 | 40.1 | 49.4 |
| 1-4 | Co—23Cr—11Pt | 8 | None | 0 | 20.4 | 32.9 | 42.6 |
| 1-5 | Co—26Cr—11Pt | 8 | None | 0 | 18.9 | 24.1 | 36.6 |
| 1-6 | Co—23Cr—11Pt | 4 | Co—14Cr—11Pt | 4 | 18.8 | 32.3 | 47.4 |
| 1-7 | Co—23Cr—11Pt | 4 | Co—17Cr—11Pt | 4 | 19.3 | 30.1 | 43.9 |
| 1-8 | Co—14Cr—11Pt | 4 | Co—23Cr—11Pt | 4 | 22.0 | 52.8 | 55.8 |
| 1-9 | Co—17Cr—11Pt | 4 | Co—23Cr—11Pt | 4 | 22.2 | 45.2 | 53.3 |
| 1-10 | Co—20Cr—11Pt | 4 | Co—23Cr—11Pt | 4 | 21.0 | 40.8 | 50.7 |
| 1-11※ | Co—23Cr—11Pt | 4 | Co—14Cr—11Pt | 4 | 17.6 | 35.4 | 41.4 |
| 1-12 | Co—19Cr—16Pt | 4 | Co—24Cr | 4 | 22.1 | 52.1 | 54.3 |
| 1-13 | Co—16Cr—11Pt | 4 | Co—21Cr—11Pt—2B | 4 | 21.8 | 53.5 | 54.2 |
| 1-14 | Co—11Cr—5Pt—5Ta | 4 | Co—22Cr—14Pt | 4 | 21.3 | 55.5 | 56.0 |

*The first recording layer has a composition in which 8 mol. % of Si oxide is added to Co—19at. % Cr—18at. % Pt alloy.

Samples 1-1 to 1-5 are samples having one layer of the recording layer not containing the oxide. When comparing the Samples 1-1 to 1-5, while the Sample 1-1 with the lowest Cr concentration in the second recording layer not containing the oxide showed most excellent OW characteristic, it showed the lowest value for the medium SNR. As the Cr concentration in the second recording layer increased, the medium SNR was improved. While the Sample 1-4 showed the highest medium SNR, the OW characteristic was deteriorated simultaneously and the resolution was also deteriorated. In the Sample 1-5 where the Cr concentration was increased further, the first recording layer and the second recording layer conducted magnetization reversal separately and the medium SNR was deteriorated compared with Sample 1-4. As described above, in the perpendicular magnetic recording medium in which a recording layer comprising the CoCr alloy not containing oxide was stacked by only one layer over the granular type recording layer with addition of the oxide to the CoCrPt alloy known so far, it was difficult to attain the high centration in the second recording layer is made lower than the Cr concentration in the third recording layer is effective.

Figure 6:
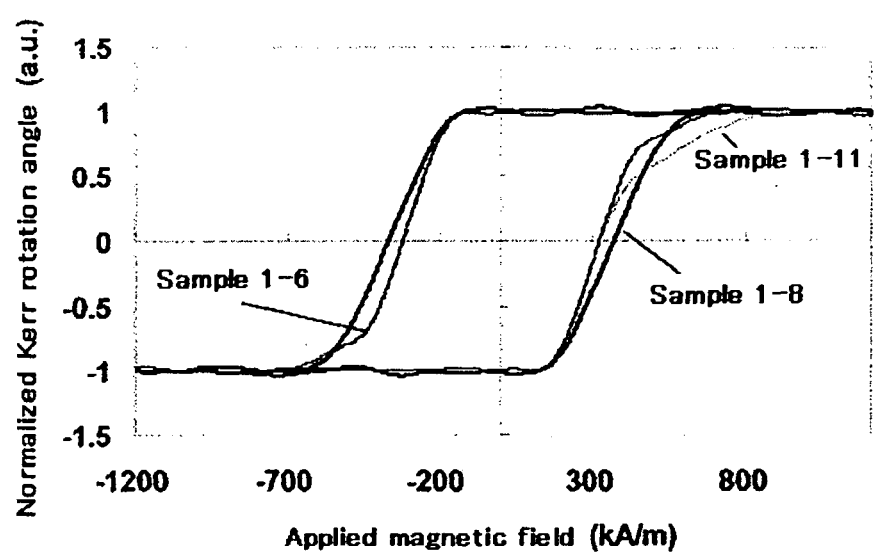
FIG. 6 is a view showing a Kerr loop in the perpendicular direction of a sample described in Experimental Example 1 of an embodiment of the present invention.

FIG. 6 shows the Kerr loop in the perpendicular direction of Sample 1-6, Sample 1-8, and Sample 1-11. Sample 1-11 was prepared with the same film constitution and under the same film deposition condition as those in Sample 1-6 except that the composition for the first recording layer in which (Co-19 at. % Cr-18 at. % Pt)-8 mol % SiO2 was used as the first recording layer.

As shown in FIG. 6, in Sample 1-6 and Sample 1-11 in which the Cr concentration in the second recording layer not containing the oxide is higher than the Cr concentration in the third recording layer, the gradient of the loop changes on the side of high magnetic field. The gradient of the loop changes greatly on the side of the lower magnetic field in the Sample 1-11 with high Cr concentration and low saturation magnetization of the first recording layer compared with Sample 1-6. This Kerr loop was not observed in the samples including Sample 1-8 in which the Cr concentration in the second recording layer was lower than the Cr concentration in the third recording layer. It is considered that the change of the gradient of the Kerr loop as observed in Samples 1-6 and 1-11 reflects the separate reversal of magnetization between the first recording layer, and the second and third recording layers. That is, it is considered that in a case where the Cr concentration in the second recording layer not containing the oxide is higher than the Cr concentration in the third recording layer, since the first recording layer, the second recording layer, and the third recording layer tend to cause reversal of magnetization separately, the medium SNR, the OW characteristic and the resolution are degraded. That is, for attaining the high medium SNR, excellent OW characteristic, and high resolution characteristic simultaneously, it is necessary that the first recording layer, the second recording layer, and the third recording layer cause reversal of magnetization at the same time and, for this purpose, it is necessary to lower the Cr concentration in the second recording layer to be less than the Cr concentration in the third recording layer.

Also in a case of using the composition not containing Pt as the second or third recording layer as in Sample 1-12, and in a case of using a composition with addition of B, Ta, Ti, etc. to CoCrPt as the second or third recording layer as in Sample 1-13 or 1-14, high medium SNR, excellent OW characteristic, and high resolution were shown simultaneously as in Samples 1-8 to 1-10.

Figure 5:
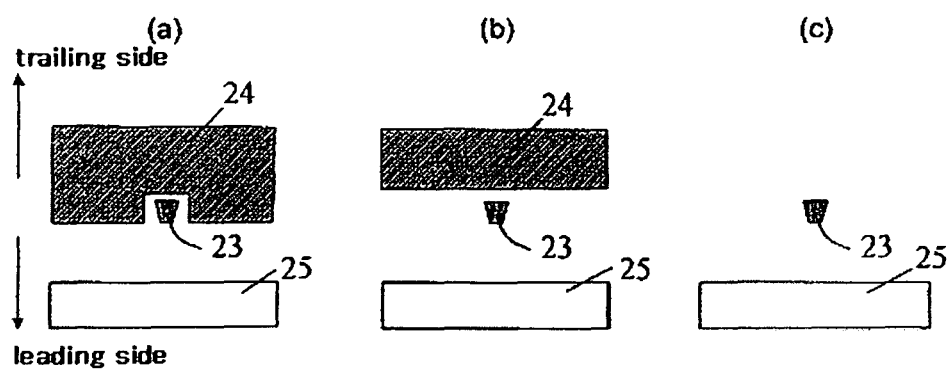
FIG. 5 is a schematic view of a recording unit of a magnetic head as viewed from an ABS surface in which (a) is a schematic view of a trailing side shield head, (b) is a schematic view of a trailing shield head, and (c) is a schematic view of a single pole heat with no shield.

Table 2 shows the result of evaluating the Samples 1-1 to 1-9 by using a general single-pole-type writer including a main pole with no shield and auxiliary pole disposed on the leading side in the down-track direction (refer to FIG. 5(c)). The track width of the write head was 90 nm and the track width for the read head was 70 nm.

In a case of evaluation by using a single-pole-type writer with no shield, the difference of the OW characteristic depending on the samples is small compared with the case of evaluation by using the shielded pole writer. The difference of the OW characteristic is small between the Samples 1-6 to 1-7 in which the Cr concentration in the second recording layer is higher than the Cr concentration in the third recording layer, and the Samples 1-8 to 1-9 in which the Cr concentration in the second recording layer is lower than the Cr concentration in the third recording layer. This is considered to be attributable to that the single-pole-type writer with no shield has sufficiently high writing field intensity. As described above, since the single-pole-type writer with no shield has a sufficiently high writing field compared with a shielded pole writer, even when the composition or the structure of the recording layer is changed, this is less reflected as the change of the OW characteristic. Further, the medium SNR obtained in a case of combination with the single-pole-type writer with no shield shows a lower value as a whole when compared with the medium SNR obtained in a case of combination with the shielded pole writer. That is, the perpendicular magnetic recording medium in which the Cr concentration in the second recording layer not containing the oxide stacked above the first recording layer of the granular structure consisting of grain boundaries containing an oxide and columnar grains comprising a CoCrPt alloy, is lower than the Cr concentration in the third recording layer and shows higher medium SNR, excellent OW characteristic, and high resolution only in a case where it is combined with the shielded pole writer.

Further, the same trend as shown in Table 1 was observed also in a case of evaluating the read/write performance by using a head in which a structure including a main pole and an auxiliary pole disposed on the leading side in the down-track direction is provided with a magnetic shield via a non-magnetic gap layer only on the trailing side in the down-track direction of the main pole (refer to FIG. 5(b)) (hereinafter referred to as trailing shield head). Further, same effect as in Table 1 was obtained also in a case of evaluating an identical sample by using a trailing side shield head in which the distance between the main pole and the trailing shield was changed in a range from 50 to 100 nm, or a trailing side shield head in which the shield height was changed in a range from 50 to 250 nm. That is, while the effect of the invention is not observed in the combination with a single-pole-type writer with no shield as shown in Table 2, the same effect as in Table 1 was obtained in a case of using a shielded pole writer even when the dimension of the magnetic head changed.

TABLE 2

| | Second recording layer | | Third recording layer | | Read/write performance | | |
|---|---|---|---|---|---|---|---|
| Sample | Composition (at. %) | Film thickness (nm) | Composition (at. %) | Film thickness (nm) | Medium SNR (dB) | OW characteristic (−dB) | Resolution (%) |
| 1-1 | Co—14Cr—11Pt | 8 | None | 0 | 14.3 | 58.1 | 52.5 |
| 1-2 | Co—17Cr—11Pt | 8 | None | 0 | 16.1 | 56.9 | 48.7 |
| 1-3 | Co—20Cr—11Pt | 8 | None | 0 | 18.9 | 52.8 | 44.2 |
| 1-4 | Co—23Cr—11Pt | 8 | None | 0 | 19.2 | 51.5 | 41.3 |
| 1-5 | Co—26Cr—11Pt | 8 | None | 0 | 19.6 | 49.7 | 38.6 |
| 1-6 | Co—23Cr—11Pt | 4 | Co—14Cr—11Pt | 4 | 19.2 | 54.1 | 38.2 |
| 1-7 | Co—23Cr—11Pt | 4 | Co—17Cr—11Pt | 4 | 19.8 | 53.4 | 36.6 |
| 1-8 | Co—14Cr—11Pt | 4 | Co—23Cr—11Pt | 4 | 19.6 | 55.8 | 43.1 |
| 1-9 | Co—17Cr—11Pt | 4 | Co—23Cr—11Pt | 4 | 20.0 | 54.4 | 42.3 |

Further, the same effect as in Table 1 is obtained also in a case of combination with magnetic heads as shown in FIG. 7A to FIG. 7E in addition to the magnetic head shown in FIG. 2.

Figure 7A:
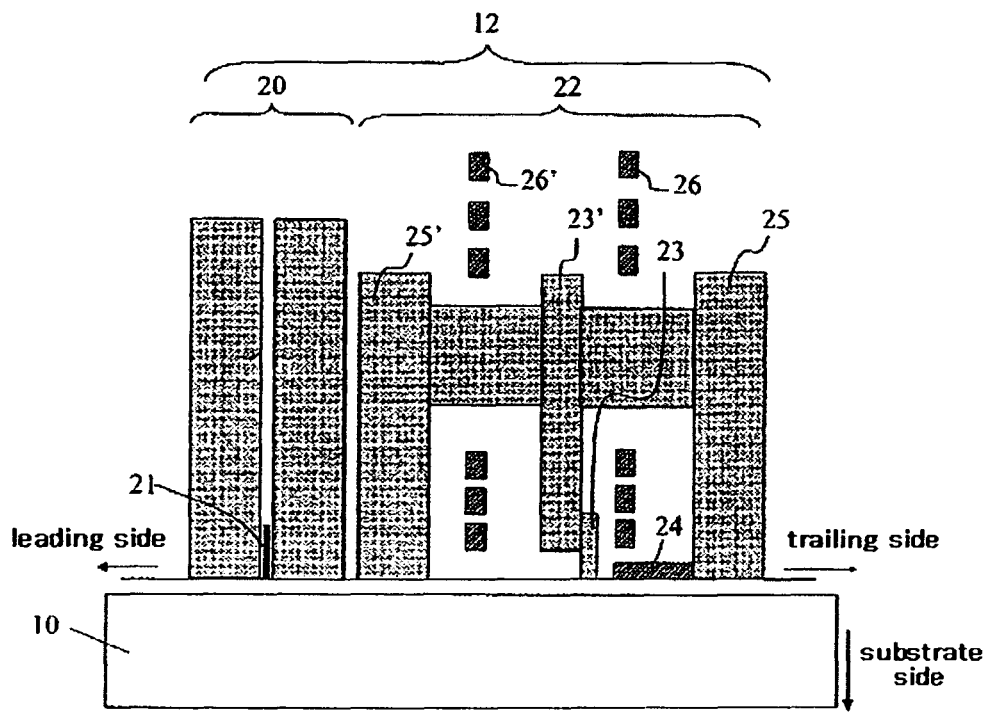
FIG. 7A is a schematic view showing a relation between a magnetic head and a magnetic recording medium.

FIG. 7A shows a relation of another combination between a magnetic head 12 and a magnetic recording medium 10 of the invention. A read portion 20 has a read element put between a pair of magnetic shields, and a giant magnetoresistive element (GMR), a tunneling magnetoresistive element (TMR), etc. are used for the read element 21. The recording unit 22 is of a structure including a main pole, two auxiliary poles 25, 25', and two coils 26, 26', in which the main pole includes a yoke part of main pole 23' and a pole tip of main pole 23, and a shield 24 is formed at the periphery of the pole tip of main pole 23 via a non-magnetic gap layer so as to cover at least the trailing side in the down-track direction of the main pole. There are two auxiliary poles and two coils are disposed between them. Current in opposite directions is supplied to the coils 26 and 26' such that magnetic fluxes flow in the same direction to the main pole. With the structure described above, a magnetic field with improved write-field gradients can be obtained and the rising response of the magnetic field to the writing current can be made fast. Further, since the magnetic field leaked from the auxiliary pole can be decreased, erasing of data written on the medium can be prevented.

Figure 7B:
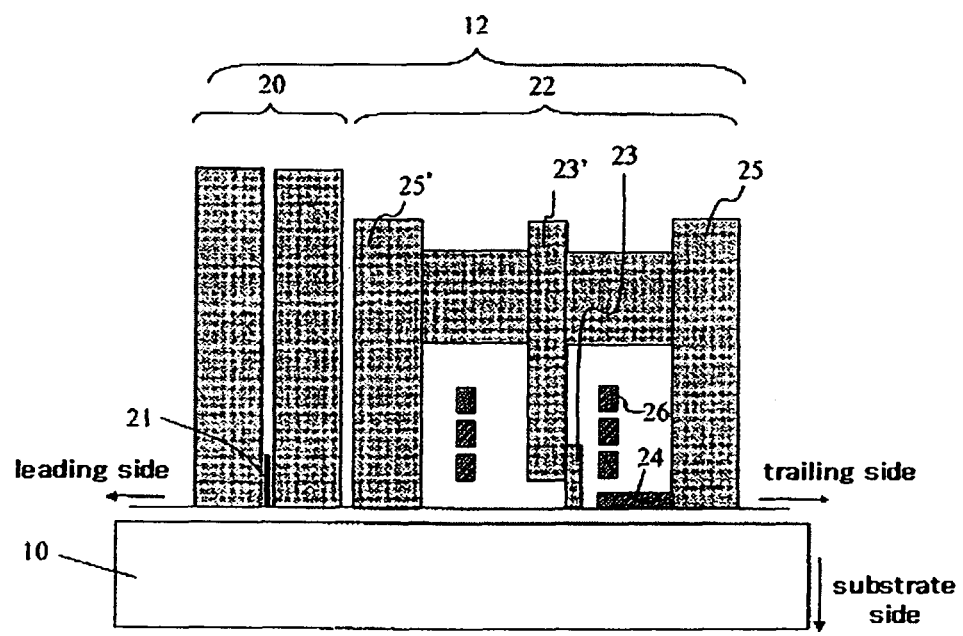
FIG. 7B is a schematic view showing a relation between a magnetic head and a magnetic recording medium.

FIG. 7B shows a relation of another combination between a magnetic head 12 and a magnetic recording medium 10 according to embodiments of the invention. A read portion 20 has a read element put between a pair of magnetic shields, and a giant magnetoresistive element (GMR), a tunneling magnetoresistive element (TMR), etc. are used for the read element 21. The recording unit 22 is of a structure including a main pole, two auxiliary poles 25, 25', and coils 26, in which the main pole includes a yoke part of main pole 23' and a pole tip of main pole 23, and a shield 24 is formed at the periphery of the pole tip of main pole 23 via a non-magnetic gap layer so as to cover at least the trailing side in the down-track direction of the main pole. This is a structure in which the coil 26 is wound around the main pole. Also with the structure described above, a magnetic field with improved write-field gradients can be obtained and the rising response of the magnetic field to the writing current can be made fast. Further, since the magnetic field leaked from the auxiliary pole can be decreased, erasing of data written on the medium can be prevented.

Figure 7C:
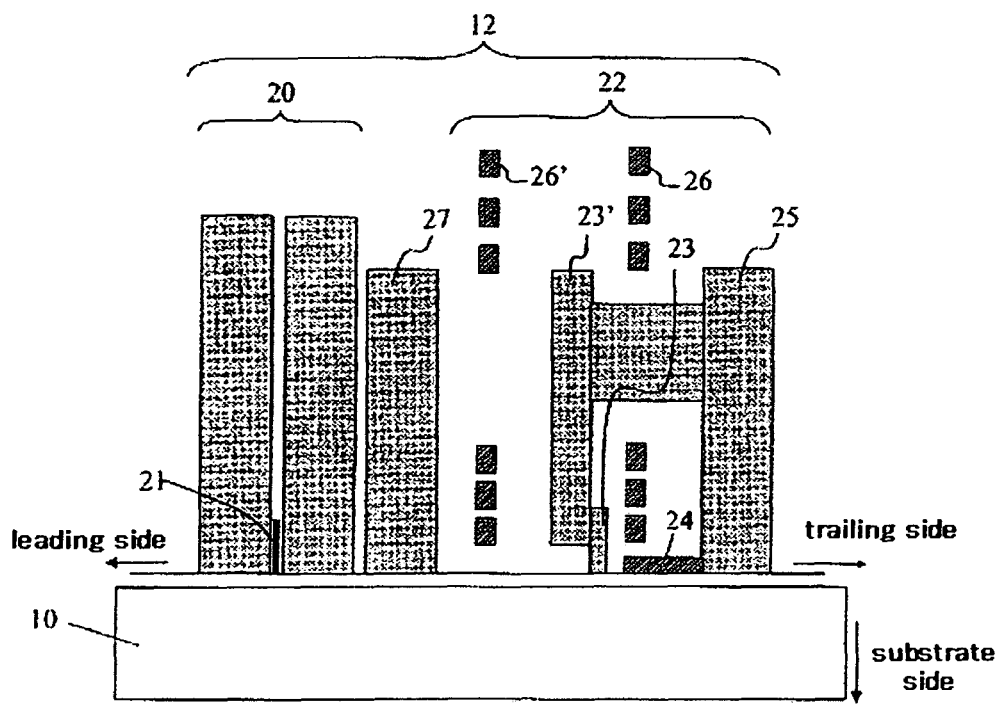
FIG. 7C is a schematic view showing a relation between a magnetic head and a magnetic recording medium.

FIG. 7C shows a relation of another combination between a magnetic head 12 and a magnetic recording medium 10 according to embodiments of the present invention. A read portion 20 has a read element put between a pair of magnetic shields, and a giant magnetoresistive element (GMR), a tunneling magnetoresistive element (TMR), etc. are used for the read element 21. The recording unit 22 is of a structure including a main pole, an auxiliary pole 25, and two coils 26, 26', in which the main pole includes a yoke part of main pole 23' and a pole tip of main pole 23, and a shield 24 is formed at the periphery of the pole tip of main pole 23 via a non-magnetic gap layer so as to cover at least the trailing side in the down-track direction of the main pole. Coils are disposed on both of the trailing side and the leading side of the main pole. Current in opposite directions is supplied to the coils 26, 26' such that magnetic fluxes in the same direction flow to the main pole. Further, an auxiliary shield 27 made of magnetics is disposed between the main pole and the read shield so as to prevent the magnetic flux from flowing into the read element from the main pole. With such structure described above, the magnetic head improved with the write-field gradients can be obtained, and the rising response of the magnetic field to the writing current can be made fast while suppressing the flowing of the magnetic flux into the read element. Further, since the magnetic field leaking from the auxiliary pole can be decreased, erasing of data written on the medium can be prevented.

Figure 7D:
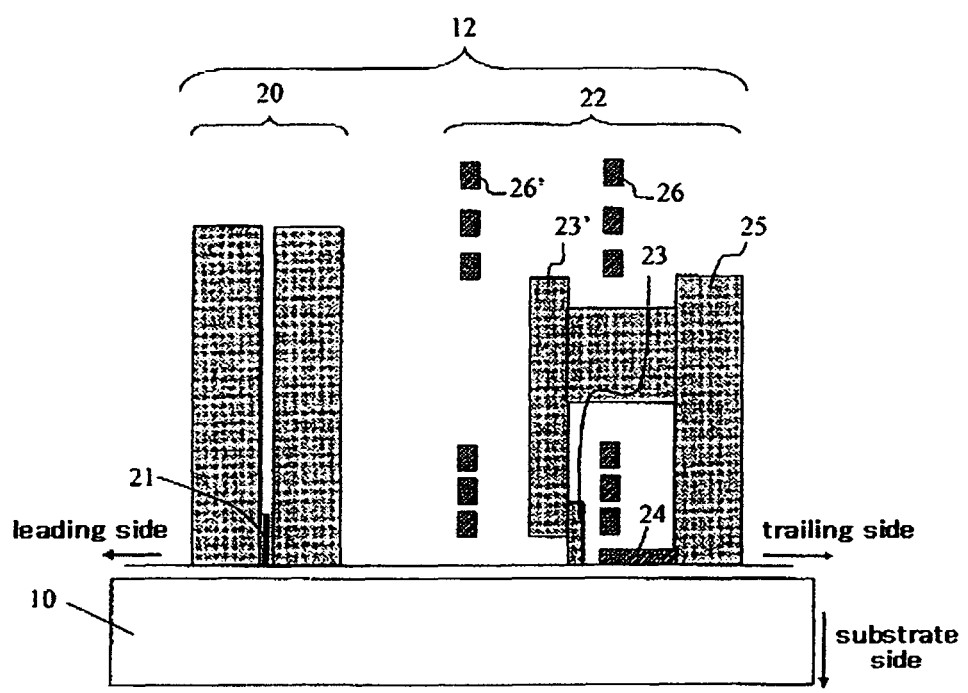
FIG. 7D is a schematic view showing a relation between a magnetic head and a magnetic recording medium.

FIG. 7D shows a relation of another combination between a magnetic head 12 and a magnetic recording medium 10 according to an embodiments of the present invention. A read portion 20 has a read element put between a pair of magnetic shields, and a giant magnetoresistive element (GMR), a tunneling magnetoresistive element (TMR), etc. are used for the read element 21. The recording unit 22 is of a structure including a main pole, an auxiliary pole 25, and two coils 26, 26', in which the main pole includes a yoke part of main pole 23' and a pole tip of main pole 23, and a shield 24 is formed at the periphery of the pole tip of main pole 23 via a non-magnetic gap layer so as to cover at least the trailing side in the down-track direction of the main pole. It has a feature in that the coils are disposed on both of the trailing side and the leading side of the main pole. Current in opposite directions is supplied to the coils 26, 26' such that magnetic fluxes in the same direction flow to the main pole. With such a structure, a magnetic field improved with the write-field gradients can be obtained and the rising response of the magnetic field to the write current can be made fast. Further, since the magnetic field leaking from the auxiliary pole can be decreased, erasing of data written on the medium can be prevented.

Figure 7E:
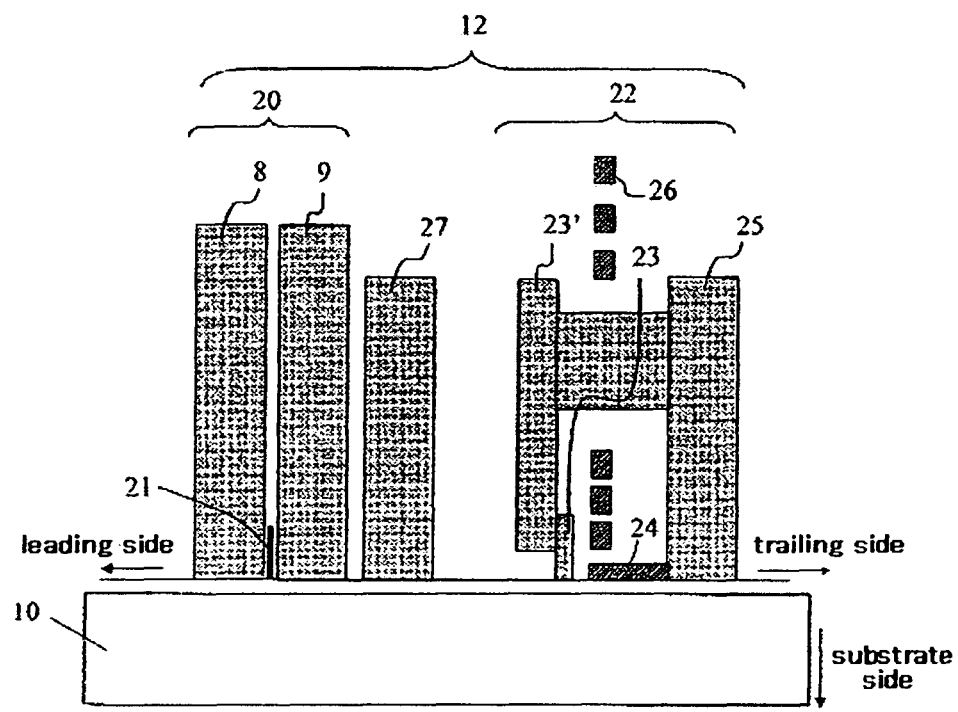
FIG. 7E is a schematic view showing a relation between a magnetic head and a magnetic recording medium.

FIG. 7E shows a relation of another combination between a magnetic head 12 and a magnetic recording medium 10 according to embodiments of the present invention. A read portion 20 has a read element put between a pair of magnetic shields, and a giant magnetoresistive element (GMR), tunneling magnetoresistive element (TMR), etc. are used for the read element 21. A recording unit 22 is of a structure including a main pole, an auxiliary pole 25, coil 26, the main pole includes a yoke part of main pole 23' and a pole tip of main pole 23, and a shield 24 is formed at the periphery of the pole tip of main pole 23 via a non-magnetic gap layer so as to cover at least the trailing side in the down-track direction of the main pole. Further, an auxiliary shield 27 made of magnetics is disposed between the main pole and the read shield so as to prevent the magnetic fluxes from flowing to the read element from the main pole. With such a structure, a magnetic field with improved write-field gradients can be obtained while suppressing the magnetic flux from flowing to the read element.

The effect of embodiments in accordance with the present invention is not restricted by the kind of the substrate, and the material, forming process, film thickness of the pre-coat layer, soft-magnetic underlayer, seed layer, etc. and the same effect can be obtained, for example, also in a case of not using the pre-coat layer, in a case of not using the soft-magnetic underlayer, in a case of using an FeCoB alloy as the soft-magnetic underlayer, or in a case of using Ta-30 at. % Cr or Ni-37.5 at. % Ta as the first seed layer, and in a case of using an NiCr alloy such as Ni-10 at. % Cr, or Ni-10 at. % Cr-3 at. % W as the second seed layer. Further, the intermediate layer in adjacent with the first recording layer is not restricted to Ru, and the same effect can be obtained, for example, also in a case of using a Ru alloy such as Ru-7 mol % SiO2, Ru-15 at. % Co, Ru-10 at. % Ti, or Ru-5 at. % Cr, or in a case where the composition of the first recording layer is different. The same effect can be obtained, for example, also in a case of using (Co-19 at. % Cr-18 at. % Pt)-8 mol. % $SiO_2$, (Co-17 at. % Cr-18 at. % Pt)-9 mol. % $SiO_2$, (Co-15 at. % Cr-18 at. % Pt)-8 mol. % $SiO_2$, or (Co-12 at. % Cr-25 at. % Pt)-8 mol. % $SiO_2$.

Further, in a case of forming the first recording layer, the same effect can be obtained also by varying the concentration of an oxide to be mixed in a target used, or in a case of forming an oxide to the crystal grain boundary of the recording layer not mixing the oxide but only by introducing oxygen in the process. Further, the same effect can be obtained also, in a case of replacing the Si oxide with other oxides, for example, replacing with Ta oxide, Ti oxide, or Nb oxide. For example, the same effect is obtained also in a case of using, for example, (Co-19 at. % Cr-16 at. % Pt)-2 mol. % $Ta_2O_5$, or (Co-19 at. % Cr-16 at. % Pt)-2 mol. % $Nb_2O_5$ as the first recording layer.

Experimental Example 2

A perpendicular magnetic recording medium of Experimental Example 2 was manufactured by the same film structure and the same film forming conditions as those for Sample 1-8 in Experimental Example 1 except for the second recording layer and the third recording layer. In Experimental Example 2, the composition and the film thickness of the second recording layer and the third recording layer were changed. The read/write performance was evaluated by using the same trailing side shield head as in the case of Table 1 for Experimental Example 1. Table 3 shows the composition and the film thickness of the second recording layer and the third recording layer, and the result of the read/write performance. Table 3 also shows the value of t2/(t2+t3) in a case wherein the thickness of the second recording layer is represented by t2 (nm) and the thickness of the third recording layer is represented by t3 (nm).

teristic, and high characteristic of resolution were obtained in a case where the value for t2/(t2+t3) was 1 or more and 0.4 or less. Further, when the read/write performance was evaluated by using the trailing shield head, particularly high medium SNR, excellent OW characteristic, and high resolution were obtained in a case where the value for t2/(t2+t3) was 0.1 or more and 0.4 or less like in Table 3.

The same effect as in Table 3 is obtained also in a case of combination with the magnetic heads as in FIG. 7A to FIG. 7E in addition to the magnetic head shown in FIG. 2. For the read element 21 in FIG. 2 and FIG. 7A to FIG. 7E, a tunneling magnetoresistive element may also be used in addition to the giant magnetoresistive element. Further, the effect of embodi-

TABLE 3

| | Second recording layer | | Third recording layer | | | Read/write performance | | |
|---|---|---|---|---|---|---|---|---|
| Sample | Composition (at. %) | Film thickness t2(nm) | Composition (at. %) | Film thickness t3(nm) | t2/ (t2 + t3) | Medium SNR (dB) | OW characteristic (−dB) | Resolution (%) |
| 2-1 | Co—16Cr—9Pt | 8 | Co—22Cr—14Pt | 0 | 1.00 | 17.1 | 55.1 | 53.1 |
| 2-2 | Co—16Cr—9Pt | 5 | Co—22Cr—14Pt | 3 | 0.63 | 21.7 | 53.4 | 52.4 |
| 2-3 | Co—16Cr—9Pt | 4 | Co—22Cr—14Pt | 4 | 0.50 | 21.9 | 51.7 | 51.9 |
| 2-4 | Co—16Cr—9Pt | 4.5 | Co—22Cr—14Pt | 5.5 | 0.45 | 22.1 | 51.5 | 51.7 |
| 2-5 | Co—16Cr—9Pt | 3.2 | Co—22Cr—14Pt | 4.8 | 0.40 | 22.7 | 51.2 | 51.6 |
| 2-6 | Co—16Cr—9Pt | 3 | Co—22Cr—14Pt | 5 | 0.38 | 22.8 | 51.2 | 51.4 |
| 2-7 | Co—16Cr—9Pt | 2 | Co—22Cr—14Pt | 6 | 0.25 | 23.1 | 49.0 | 50.1 |
| 2-8 | Co—16Cr—9Pt | 1 | Co—22Cr—14Pt | 7 | 0.13 | 23.0 | 48.6 | 49.7 |
| 2-9 | Co—16Cr—9Pt | 0.8 | Co—22Cr—14Pt | 7.2 | 0.10 | 22.9 | 46.9 | 48.2 |
| 2-10 | Co—16Cr—9Pt | 0.5 | Co—22Cr—14Pt | 7.5 | 0.06 | 21.6 | 41.6 | 43.2 |
| 2-11 | Co—16Cr—9Pt | 0 | Co—22Cr—14Pt | 8 | 0.00 | 20.5 | 36.4 | 40.9 |
| 2-12 | Co—16Cr—9Pt | 2 | Co—22Cr—14Pt | 4 | 0.33 | 23.2 | 50.9 | 51.0 |
| 2-13 | Co—16Cr—9Pt | 1 | Co—22Cr—14Pt | 4 | 0.20 | 22.9 | 48.6 | 48.1 |
| 2-14 | Co—19Cr | 2 | Co—23Cr—16Pt | 6 | 0.25 | 23.1 | 47.7 | 50.2 |
| 2-15 | Co—17Cr—11Pt | 2 | Co—21Cr—11Pt—2B | 4 | 0.33 | 22.9 | 53.5 | 54.2 |
| 2-16 | Co—17Cr—5Pt—5Ta | 2 | Co—23Cr—14Pt | 6 | 0.25 | 22.7 | 51.2 | 49.7 |

Figure 8:
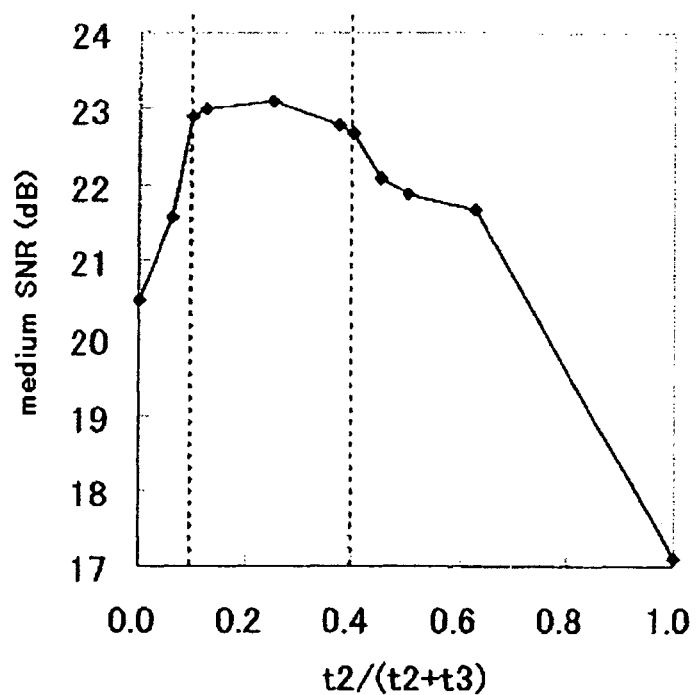
FIG. 8 is a view showing a relation between t2/(t2+t3) of samples described in Experimental Example 2 of one embodiment of the present invention and medium SNR.

FIG. 8 shows a relation between the value for t2/(t2+t3) and the medium SNR. At first, the read/write performance of Samples 2-1 to 2-11 in the combination of the same compositions for the second and the third recording layers are compared. While the difference between the medium SNR of Samples 2-2 to 2-4 or Sample 2-10 and the medium SNR of Sample 2-11 was 1.4 dB or less, a medium SNR as high as by 2 dB or more was obtained in the Samples 2-5 to 2-9 having the value for t2/(t2+t3) of 0.1 or more and 0.4 or less, compared with Sample 2-11. In this case, also the OW characteristic showed an excellent value of −40 dB or more, and the resolution also showed a high value of 45% or more. That is, since the second recording layer of low Cr concentration has large inter-granular exchange coupling and tends to be a medium noise source, it is desirable that the thickness is as thin as possible within a range of the thickness necessary for reversal of magnetization for the first, second, and third recording layers all at once, whereas the thickness of the third recording layer of high Cr concentration is desirably as thick as possible since it has a large effect of enhancing the improvement of the medium SNR. High medium SNR of 22.5 dB or more was obtained also in the Samples 2-12, 13 with the total film thickness for the second recording layer and the third recording layer being changed like that in Samples 2-5 to 2-9.

Also in a case of using a composition not containing Pt for the second or the third recording layer or in a case of using a composition with addition of B, Ta, Ti, etc. to CoCrPt as the second or the third recording layer, as in Samples 2-14 and 2-16, particularly high medium SNR, excellent OW characments of the present invention is not restricted by the kind of the substrate, and the material, forming process, film thickness of the pre-coat layer, soft-magnetic underlayer, seed layer, etc. and the same effect can be obtained, for example, also in a case of not using the pre-coat layer, in a case of not using the soft-magnetic underlayer, in a case of using an FeCoB alloy as the soft-magnetic underlayer, or in a case of using Ta-30 at. % Cr or Ni-37.5 at. % Ta as the first seed layer, and in a case of using an NiCr alloy such as Ni-10 at. % Cr, or Ni-10 at. % Cr-3 at. % W as the second seed layer. Further, the intermediate layer in adjacent with the first recording layer is not restricted to Ru, and the same effect can be obtained, for example, also in a case of using a Ru alloy such as Ru-7 mol % $SiO_2$, Ru-15 at. % Co, Ru-10 at. % Ti, or Ru-5 at. % Cr, or in a case where the composition of the first recording layer is different. The same effect can be obtained, for example, also in a case of using (Co-19 at. % Cr-18 at. % Pt)-8 mol. % $SiO_2$, (Co-17 at. % Cr-18 at. % Pt)-9 mol. % $SiO_2$, (Co-15 at. % Cr-18 at. % Pt)-8 mol. % $SiO_2$, or (Co-12 at. % Cr-25 at. % Pt)-8 mol. % $SiO_2$.

Further, in a case of forming the first recording layer, the same effect can be obtained also by varying the concentration of an oxide to be mixed in a target used, or in a case of forming an oxide to the crystal grain boundary of the recording layer not mixing the oxide but only by introducing oxygen in the process. Further, the same effect can be obtained also, in a case of replacing the Si oxide with other oxides, for example, replacing with Ta oxide, Ti oxide, or Nb oxide. For example, the same effect is obtained also in a case of using, for example, (Co-19 at. % Cr-16 at. % Pt)-2 mol. % Ta$_2$O$_5$, or (Co-19 at. % Cr-16 at. % Pt)-2 mol. % Nb$_2$O$_5$ as the first recording layer.

Experimental Example 3

Samples of Experimental Example 3 were manufactured by the same film structure and the same film forming conditions as those for Sample 1-8 in Experimental Example 1 except for the second recording layer and the third recording layer. The thickness of the second recording layer was 2 nm, the thickness of the third recording layer was 6 nm (t2/(t2+t3)=0.25), the Pt concentration for each of the second recording layer, and the third recording layer was set to 11 at. % and the Cr concentration and the Co concentration were changed. For the samples, the medium SNR was evaluated by using the same trailing side shield head as in the case of Table 1 of Experimental Example 1. The difference between the Cr concentration (a) in the second recording layer and the Cr concentration (b) in the third recording layer (b−a) was determined and the obtained medium SNR is shown in Table 4. In Table 4, samples showing the medium SNR higher by 2 dB than that of Sample 1-4 in Table 1 (22.4 dB or more) were shown by rank A, and the medium showing the SNR having a difference of less than 2 dB from that of Sample 1-4 (20.4 dB or more and less than 22.4 dB) were shown by rank B.

TABLE 4

| Sample | Cr concentration in second recording layer (=a) (at. %) | Cr concentration in third recording layer (=b) (at. %) | b − a (at. %) | Medium SNR (dB) | Rank for medium SNR |
|---|---|---|---|---|---|
| 3-1 | 17 | 19 | 2 | 21.7 | B |
| 3-2 | 15 | 19 | 4 | 22.2 | B |
| 3-3 | 14 | 19 | 5 | 22.1 | B |
| 3-4 | 13 | 19 | 6 | 22.1 | B |
| 3-5 | 12 | 19 | 7 | 21.9 | B |
| 3-6 | 10 | 19 | 9 | 21.9 | B |
| 3-7 | 9 | 19 | 10 | 21.7 | B |
| 3-8 | 18 | 20 | 2 | 21.8 | B |
| 3-9 | 17 | 20 | 3 | 21.9 | B |
| 3-10 | 16 | 20 | 4 | 22.8 | A |
| 3-11 | 15 | 20 | 5 | 22.7 | A |
| 3-12 | 14 | 20 | 6 | 22.7 | A |
| 3-13 | 13 | 20 | 7 | 22.5 | A |
| 3-14 | 12 | 20 | 8 | 22.1 | B |
| 3-15 | 11 | 20 | 9 | 22.0 | B |
| 3-16 | 10 | 20 | 10 | 21.9 | B |
| 3-17 | 9 | 20 | 11 | 21.7 | B |
| 3-18 | 20 | 22 | 2 | 21.6 | B |
| 3-19 | 19 | 22 | 3 | 21.8 | B |
| 3-20 | 18 | 22 | 4 | 22.7 | A |
| 3-21 | 17 | 22 | 5 | 23.1 | A |
| 3-22 | 16 | 22 | 6 | 23.0 | A |
| 3-23 | 14 | 22 | 8 | 22.9 | A |
| 3-24 | 13 | 22 | 9 | 22.8 | A |
| 3-25 | 12 | 22 | 10 | 22.1 | B |
| 3-26 | 11 | 22 | 11 | 21.9 | B |
| 3-27 | 10 | 22 | 12 | 21.6 | B |
| 3-28 | 9 | 22 | 13 | 21.5 | B |
| 3-29 | 21 | 23 | 2 | 21.7 | B |
| 3-30 | 20 | 23 | 3 | 21.8 | B |
| 3-31 | 19 | 23 | 4 | 22.7 | A |
| 3-32 | 18 | 23 | 5 | 23.1 | A |
| 3-33 | 17 | 23 | 6 | 23.6 | A |
| 3-34 | 15 | 23 | 8 | 23.4 | A |
| 3-35 | 14 | 23 | 9 | 23.3 | A |
| 3-36 | 13 | 23 | 10 | 23.2 | A |
| 3-37 | 12 | 23 | 11 | 22.2 | B |
| 3-38 | 11 | 23 | 12 | 21.8 | B |
| 3-39 | 10 | 23 | 13 | 21.7 | B |
| 3-40 | 9 | 23 | 14 | 21.6 | B |
| 3-41 | 22 | 24 | 2 | 21.7 | B |
| 3-42 | 21 | 24 | 3 | 21.9 | B |
| 3-43 | 20 | 24 | 4 | 22.0 | B |
| 3-44 | 19 | 24 | 5 | 22.9 | A |
| 3-45 | 18 | 24 | 6 | 23.4 | A |
| 3-46 | 16 | 24 | 8 | 23.5 | A |
| 3-47 | 14 | 24 | 10 | 23.3 | A |
| 3-48 | 13 | 24 | 11 | 23.1 | A |
| 3-49 | 12 | 24 | 12 | 22.3 | B |
| 3-50 | 11 | 24 | 13 | 22.2 | B |
| 3-51 | 10 | 24 | 14 | 22.1 | B |
| 3-52 | 9 | 24 | 15 | 21.9 | B |
| 3-53 | 8 | 24 | 16 | 21.8 | B |
| 3-54 | 23 | 25 | 2 | 21.6 | B |
| 3-55 | 22 | 25 | 3 | 21.7 | B |
| 3-56 | 21 | 25 | 4 | 22.0 | B |
| 3-57 | 19 | 25 | 6 | 22.1 | B |
| 3-58 | 18 | 25 | 7 | 22.1 | B |
| 3-59 | 17 | 25 | 8 | 22.0 | B |
| 3-60 | 16 | 25 | 9 | 21.9 | B |
| 3-61 | 15 | 25 | 10 | 21.8 | B |
| 3-62 | 14 | 25 | 11 | 21.7 | B |
| 3-63 | 12 | 25 | 13 | 21.7 | B |
| 3-64 | 10 | 25 | 15 | 21.7 | B |
| 3-65 | 8 | 25 | 17 | 21.6 | B |

Samples 3-10 to 3-13, 3-20 to 3-24, 3-31 to 3-36, and 3-44 to 3-48 having the Cr concentration in the second recording layer of 13 at. % or more and 19 at. % or less, the Cr concentration in the third recording layer of 20 at. % or more and 24 at. % or less and the value (b−a) of 4 at. % or more showed the medium SNR of rank A. In each of the cases, the OW characteristic showed an excellent value over −40 dB, and the resolution also showed a high value of 45% or more. Particularly high medium SNR was shown for the samples having the Cr concentration in the second recording layer of 13 at. % or more and 19 at. % or less, the Cr concentration in the third recording layer of 20 at. % or more and 24 at. % or less, and the (b−a) value of 4 at. % or more as in Table 4, also in a case where the Pt concentration was different between the second recording layer and third recording layer, in a case of changing the thickness and the thickness ratio: t2/(t2+t3) for the second recording layer and the third recording layer, and in a case of combination with the trailing shield head. Further, the same effect is obtained also in a case of combination with the magnetic heads as shown in FIG. 7A to FIG. 7E in addition to the magnetic head shown in FIG. 2. For the read element 21 in FIG. 2 and FIG. 7A to FIG. 7E, a tunneling magnetoresistive element may also be used in addition to the giant magnetoresistive element.

It was confirmed that the magnetic storage apparatus using the trailing side shield head and Sample 3-32 used in this experimental example operated at 34.2 Gbit/cm$^2$ by setting the linear recording density per 1 cm to 403540 bits and a track density per 1 cm to 84645 tracks.

The effect of embodiments in accordance with the present invention is not restricted by the kind of the substrate, and the material, forming process, film thickness of the pre-coat layer, soft-magnetic underlayer, seed layer, etc. and the same effect can be obtained, for example, also in a case of not using the pre-coat layer, in a case of not using the soft-magnetic underlayer, in a case of using an FeCoB alloy as the soft-magnetic underlayer, or in a case of using Ta-30 at. % Cr or Ni-37.5 at. % Ta as the first seed layer, and in a case of using an NiCr alloy such as Ni-10 at. % Cr, or Ni-10 at. % Cr-3 at. % W as the second seed layer. Further, the intermediate layer in adjacent with the first recording layer is not restricted to Ru, and the same effect can be obtained, for example, also in a case of using a Ru alloy such as Ru-7 mol % $SiO_2$, Ru-15 at. % Co, Ru-10 at. % Ti, or Ru-5 at. % Cr, or in a case where the composition of the first recording layer is different. The same effect can be obtained, for example, also in a case of using (Co-19 at. % Cr-18 at. % Pt)-8 mol. % $SiO_2$, or (Co-17 at. % Cr-18 at. % Pt)-9 mol. % $SiO_2$.

Further, in a case of forming the first recording layer, the same effect can be obtained also by varying the concentration of an oxide to be mixed in a target used, or in a case of forming an oxide to the crystal grain boundary of the recording layer not mixing the oxide but only by introducing oxygen in the process. Further, the same effect can be obtained also, in a case of replacing the Si oxide with other oxides, for example, replacing with Ta oxide, Ti oxide, or Nb oxide. For example, the same effect is obtained also in a case of using, for example, (Co-19 at. % Cr-16 at. % Pt)-2 mol. % $Ta_2O_5$, or (Co-19 at. % Cr-16 at. % Pt)-2 mol. % $Nb_2O_5$ as the first recording layer.

INDUSTRIAL APPLICABILITY

Embodiments of the present invention can provide a perpendicular magnetic recording medium of high reliability capable of providing high medium SNR, excellent OW characteristic, and high resolution simultaneously, particularly, capable of high density recording exceeding 30 Gbits/cm$^2$ and endurable for long time use in combination with a shielded pole writer. Use of such a perpendicular magnetic recording medium in combination with the shielded pole writers can provide a small size and large capacity magnetic storage apparatus.

What is claimed is:

1. A magnetic storage apparatus including a perpendicular magnetic recording medium, a magnetic recording medium driver for driving the perpendicular magnetic recording medium in a recording direction, a magnetic head having a recording unit and a read element, a magnetic head driver for relatively driving the magnetic head to the perpendicular magnetic recording medium, and a signal processing unit for processing input signals and output signals to the magnetic head in which the recording unit of the magnetic head has a main pole, an auxiliary pole, and a magnetic shield disposed at least on the trailing side of the main pole via a non-magnetic gap layer, the perpendicular magnetic recording medium has a first recording layer having a granular structure comprising grain boundaries containing an oxide and columnar grains comprising a CoCrPt alloy, a second recording layer formed over the first recording layer, and a third recording layer formed directly on the second recording layer, the second recording layer and the third recording layer comprise Co as a main ingredient, contain Cr and do not contain an oxide, and the Cr concentration in the second recording layer is lower than the Cr concentration in the third recording layer, wherein t2/(t2+t3) is 0.1 or more and 0.4 or less in which t2 is a thickness of the second recording layer and t3 is a thickness of the third recording layer.

2. A magnetic storage apparatus according to claim 1, wherein the Cr concentration in the second recording layer is 13 at. % or more and 19 at. % or less, the Cr concentration in the third recording layer is 20 at. % or more and 24 at. % or less, and the difference of the Cr concentration between the second recording layer and the Cr concentration in the third recording layer is 4 at. % or more.

3. A magnetic storage apparatus according to claim 1, wherein the perpendicular magnetic recording medium has a seed layer and an intermediate layer, and the first recording layer is formed over the intermediate layer.

4. A magnetic storage apparatus according to claim 3, wherein the perpendicular magnetic recording medium has a soft-magnetic underlayer, and the seed layer is formed on a soft-magnetic underlayer.

5. A magnetic storage apparatus including a perpendicular magnetic recording medium, and a magnetic head having a recording unit and a read element, in which the recording unit of the magnetic head has a main pole, an auxiliary pole, and a magnetic shield disposed at least on the trailing side of the main pole, wherein the magnetic shield disposed at least on the trailing side of the main pole is not magnetically coupled to the main pole, the perpendicular magnetic recording medium has a first recording layer having a granular structure comprising grain boundaries containing an oxide and columnar grains comprising a CoCrPt alloy, a second recording layer formed over the first recording layer, and a third recording layer formed over the second recording layer, the second recording layer and the third recording layer comprise Co as a main ingredient, contain Cr and do not contain an oxide, and the Cr concentration in the second recording layer is lower than the Cr concentration in the third recording layer, wherein t2/(t2+t3) is 0.1 or more and 0.4 or less in which t2 is a thickness of the second recording layer and t3 is a thickness of the third recording layer.

6. A magnetic storage apparatus according to claim 5, wherein the Cr concentration in the second recording layer is 13 at. % or more and 19 at. % or less, the Cr concentration in the third recording layer is 20 at. % or more and 24 at. % or less, and the difference of the Cr concentration between the second recording layer and the Cr concentration in the third recording layer is 4 at. % or more.

7. A magnetic storage apparatus according to claim 5, wherein the perpendicular magnetic recording medium has a seed layer and an intermediate layer, and the first recording layer is formed over the intermediate layer.

8. A magnetic storage apparatus according to claim 7, wherein the perpendicular magnetic recording medium has a soft-magnetic underlayer, and the seed layer is formed on a soft-magnetic underlayer.

9. A magnetic storage apparatus according to claim 1, wherein the second recording layer is formed directly on the first recording layer.

10. A magnetic storage apparatus according to claim 1, wherein the magnetic shield disposed at least on the trailing side of the main pole is not magnetically coupled to the main pole.

11. A magnetic storage apparatus according to claim 1, further comprising an auxiliary magnetic shield disposed between the main pole and a read shield, the read shield being positioned between the read element and the main pole.

12. A magnetic storage apparatus according to claim 11, wherein the auxiliary magnetic shield is not magnetically coupled to the main pole.

13. A magnetic storage apparatus according to claim 5, wherein the second recording layer is formed directly on the first recording layer.

14. A magnetic storage apparatus according to claim 5, wherein the shield disposed at least on the trailing side of the main pole is not magnetically coupled to the main pole.

15. A magnetic storage apparatus according to claim 5, further comprising an auxiliary magnetic shield disposed between the main pole and a read shield, the read shield being positioned between the read element and the main pole.

16. A magnetic storage apparatus according to claim 15, wherein the auxiliary magnetic shield is not magnetically coupled to the main pole.

17. A magnetic storage apparatus including a perpendicular magnetic recording medium, and a magnetic head having a recording unit and a read element, in which the recording unit of the magnetic head has a main pole, an auxiliary pole, a magnetic shield disposed at least on the trailing side of the main pole, and an auxiliary magnetic shield disposed between the main pole and a read shield, the read shield being positioned between the read element and the main pole the perpendicular magnetic recording medium has a first recording layer having a granular structure comprising grain boundaries containing an oxide and columnar grains comprising a CoCrPt alloy, a second recording layer formed over the first recording layer, and a third recording layer formed over the second recording layer, wherein the second recording layer and the third recording layer comprise Co as a main ingredient, contain Cr and do not contain an oxide, and the Cr concentration in the second recording layer is lower than the Cr concentration in the third recording layer wherein t2/(t2+t3) is 0.1 or more and 0.4 or less in which t2 is a thickness of the second recording layer and t3 is a thickness of the third recording layer.

18. A magnetic storage apparatus according to claim 17, wherein the auxiliary magnetic shield is not magnetically coupled to the main pole.

* * * * *